United States Patent [19]
Tawfik et al.

[11] 4,217,486
[45] Aug. 12, 1980

[54] DIGITAL FLIGHT GUIDANCE SYSTEM

[75] Inventors: David A. Tawfik, Woodcliff Lake; Jerry Doniger, Montvale; Donald J. Porawski, Cedar Grove, all of N.J.

[73] Assignee: The Bendix Corporation, Teterboro, N.J.

[21] Appl. No.: 8,132

[22] Filed: Jan. 31, 1979

Related U.S. Application Data

[63] Continuation-in-part of Ser. No. 802,685, Jun. 2, 1977, abandoned.

[51] Int. Cl.² ............... G06F 15/50; G06F 11/08
[52] U.S. Cl. ..................... 371/68; 244/194; 318/564; 364/101; 364/119
[58] Field of Search ............... 364/432–435, 364/439, 444–579, 586, 101, 119; 235/307, 303.4; 244/175–195; 318/564

[56] References Cited

U.S. PATENT DOCUMENTS

| | | | |
|---|---|---|---|
| 3,517,174 | 6/1970 | Ossfeldt | 235/307 |
| 3,688,099 | 8/1972 | Buscher | 235/307 |
| 3,770,948 | 11/1973 | Caputo et al. | 235/307 |
| 4,030,074 | 6/1977 | Giorcelli | 235/307 |
| 4,032,757 | 6/1977 | Eccles | 318/564 |
| 4,035,705 | 7/1977 | Miller | 318/564 |
| 4,096,989 | 6/1978 | Tawfik | 235/307 |
| 4,101,958 | 7/1978 | Patterson et al. | 235/307 |
| 4,115,847 | 9/1978 | Osder et al. | 235/307 |
| 4,130,241 | 12/1978 | Meredith et al. | 235/307 |

FOREIGN PATENT DOCUMENTS 2108836  9/1972  Fed. Rep. of Germany ........... 318/564

OTHER PUBLICATIONS

DiPilato: IBM Technical Disclosure Bull., vol. 18, No. 12, May 1976, pp. 4040/4041, Synchronization of Two Controllers.

Primary Examiner—Felix D. Gruber
Attorney, Agent, or Firm—Anthony F. Cuoco; William F. Thornton

[57] ABSTRACT

A digital flight guidance system includes a pair of processors, each with its own memory means and arranged with common input and output means for providing monitored guidance of an aircraft when the craft is in cruise modes or when the craft is performing a critical maneuver such as landing, terrain following, or the like.

10 Claims, 9 Drawing Figures

COMMAND LIMITING MEMORY DEVICE 26, 28

INNER LOOP MEMORY DEVICE 30, 32

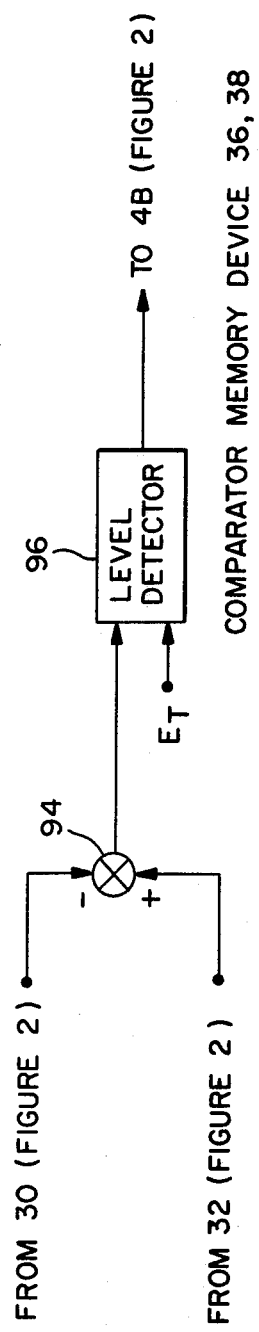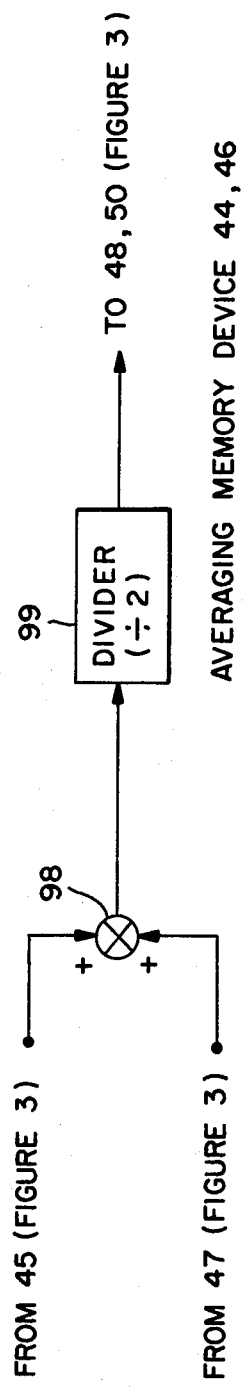

DIGITAL FLIGHT GUIDANCE SYSTEM

CROSS REFERENCE TO RELATED APPLICATIONS

This application is a continuation-in-part of U.S. Application Ser. No. 802,685, filed June 2, 1977 now abandoned.

BACKGROUND OF THE INVENTION

1. Field of the Invention

This invention relates generally to flight guidance systems and particularly to digital flight guidance systems. More particularly, this invention relates to digital flight guidance systems including a dual processor arrangement for providing monitored guidance of an aircraft when the craft is in cruise modes or performing critical flight maneuvers.

2. Description of the Prior Art

Flight guidance systems must be certified in accordance with Federal Aviation Agency (FAA) or military flight safety requirements. Prior art digital flight control systems have utilized single processor architecture which requires knowledge that certain system failures can exist and/or how the failures can be identified. In most instances, due to the nature of the digital processor involved, the required failure identification within the digital processor is not practical. The present invention overcomes this disadvantage by providing a configuration featuring a dual processor arrangement whereby the necessity for identifying the failure within a processor is obviated.

SUMMARY OF THE INVENTION

The invention contemplates a digital flight guidance system including a pair of processors, each having memory means associated therewith and utilizing common input and output means, for providing monitored guidance of an aircraft during all phases of flight including non-critical modes such as cruising and critical modes such as landing. Each processor and associated memory means monitors the other's computations and provides failure indications whenever either fails in any manner so as to render the result of its computation invalid. The two processors and associated memories may be identical or unidentical and may operate in any of the following configurations:

a. They may each perform the same computation and then compare each other's outputs.
b. They may each perform the critical mode computations, and one would perform the non-critical computations while the other would protect from a multi-axis hardover.
c. One may perform all the computations while the other would act as a "performance monitor", i.e., would monitor the aircraft maneuver to detect an abnormal behavior by the other processor.

Configuration (b) will be herein described for illustrative purposes.

Thus, when guiding the aircraft during cruise modes, one of the processors and its associated memory means performs all outer loop cruise computations as well as inner loop computations and cross processor monitoring. The other processor and its associated memory means performs only the inner loop computations and cross processor monitoring. During a critical flight maneuver such as, for purposes of illustration, a landing maneuver, each processor and its associated memory means operates on its own sensor data. In this way, even sensor failures are detected.

The arrangement is such that two servo commands are generated and compared. Any significant difference in the commands causes a system disconnect to be effected. During the landing maneuver, any single or multiple axis failure is detected, including any internal failure of either of the processors and their associated active memory devices. During the cruise mode, appropriate rate and displacement command limiting is achieved to limit maneuvers uncontrollable by the pilot of the craft due to any internal failure of either of the processors and their associated active memory devices.

With the dual processor arrangement described, each processor performs some of the functions of the other processor to provide the degree of redundancy required for a certifiable digital flight guidance system.

The main object of this invention is to provide a digital flight guidance system which is certifiable in accordance with particular Federal Aviation Agency or military flight safety requirements.

Another object of this invention is to provide a digital flight guidance system which provides monitored guidance of an aircraft during cruise and when performing critical flight maneuvers.

Another object of this invention is to provide a digital flight guidance system of the type described including a pair of processors, each having its own memory means and utlizing common input and output means.

Another object of this invention is to provide a digital flight guidance system including a dual processor arrangment wherein each processor performs some of the functions of the other processor, but in a different manner, to provide the degree of redundancy required for a certifiable system.

The foregoing and other objects and advantages of the invention will appear more fully hereinafter from a consideration of the detailed description which follows, taken together with the accompanying drawings, wherein several embodiments of the invention are illustrated by way of example. It is to be expressly understood, however, that the drawings are for illustration purposes only and are not to be construed as defining the limits of the invention, reference being made to the appended claims for this purpose.

DESCRIPTION OF THE DRAWINGS

FIG. 7 is a block diagram illustrating control laws for implementing comparator memory devices 36 and 38 shown in FIG. 2 and 3.

FIG. 8 is a block diagram illustrating control laws for implementing averaging memory devices 44 and 46 shown in FIG. 3.

DESCRIPTION OF THE INVENTION

Figure 1:
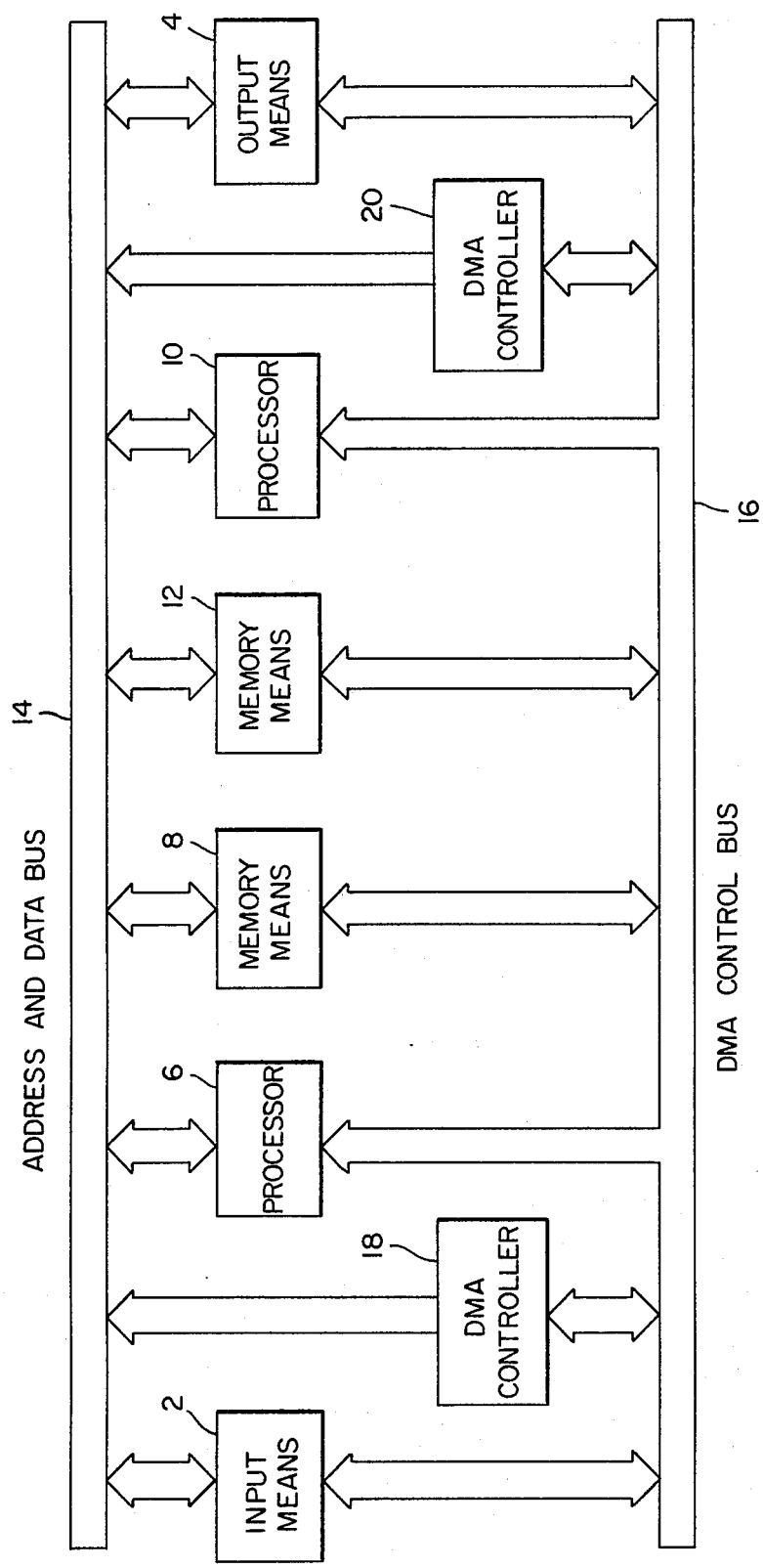
FIG. 1 is a block diagram showing generally a digital flight guidance system in accordance with the invention.

With reference first to FIG. 1, a dual processor digital flight guidance system in accordance with the invention is shown as including input means 2 and output means 4. For purposes of describing the invention, input means 2 is considered to be a conventional analog to digital converter, while output means 4 is considered to be a conventional digital to analog converter.

The arrangement shown in FIG. 1 includes a processor 6 and its associated memory means 8, and a processor 10 and its associated memory means 12. The processors and their associated memory means communicate with input means 2 and output means 4 through a common address and data bus 14 and a common direct memory access (DMA) control bus 16. Direct memory access to processor 6 and its associated memory means 8 is controlled by a DMA controller 18 while direct memory access to processor 10 and its associated memory means 12 is controlled by a DMA controller 20.

It will be understood that DMA control as illustrated in FIG. 1, reduces the real time utilization of both of the processors 6 and 10 to permit significantly less complex input means 2 and output means 4, as might otherwise be the case. The input and output means are arranged in essentially a single thread configuration, with continuous self testing by both processors. The self testing of the input and output means involves "wrap around" testing in which digital data generated by one of the processors is transmitted to output lines after a digital to analog conversion accomplished by output means 4. These outputs are then fed back through input means 2, which performs an analog to digital conversion, to the one processor where the results are compared with the originally transmitted data. Most of the hardware involved in the input/output arrangement is continuously checked in this manner. Significantly, all of the hardware that is capable of generating multiple axis failures is thus monitored by both processors. Similarly, the voltages generated by a single power supply (not shown) which powers all of the components of the system is monitored by both processors to insure proper system operation.

It will therefore be seen from FIG. 1, and as will be further described with reference to FIGS. 2 and 3, that the digital flight guidance system of the invention utilizes a dual processor arrangement, with each of the processors having its own memory means and both of the processors using common input means and output means.

Figure 2:
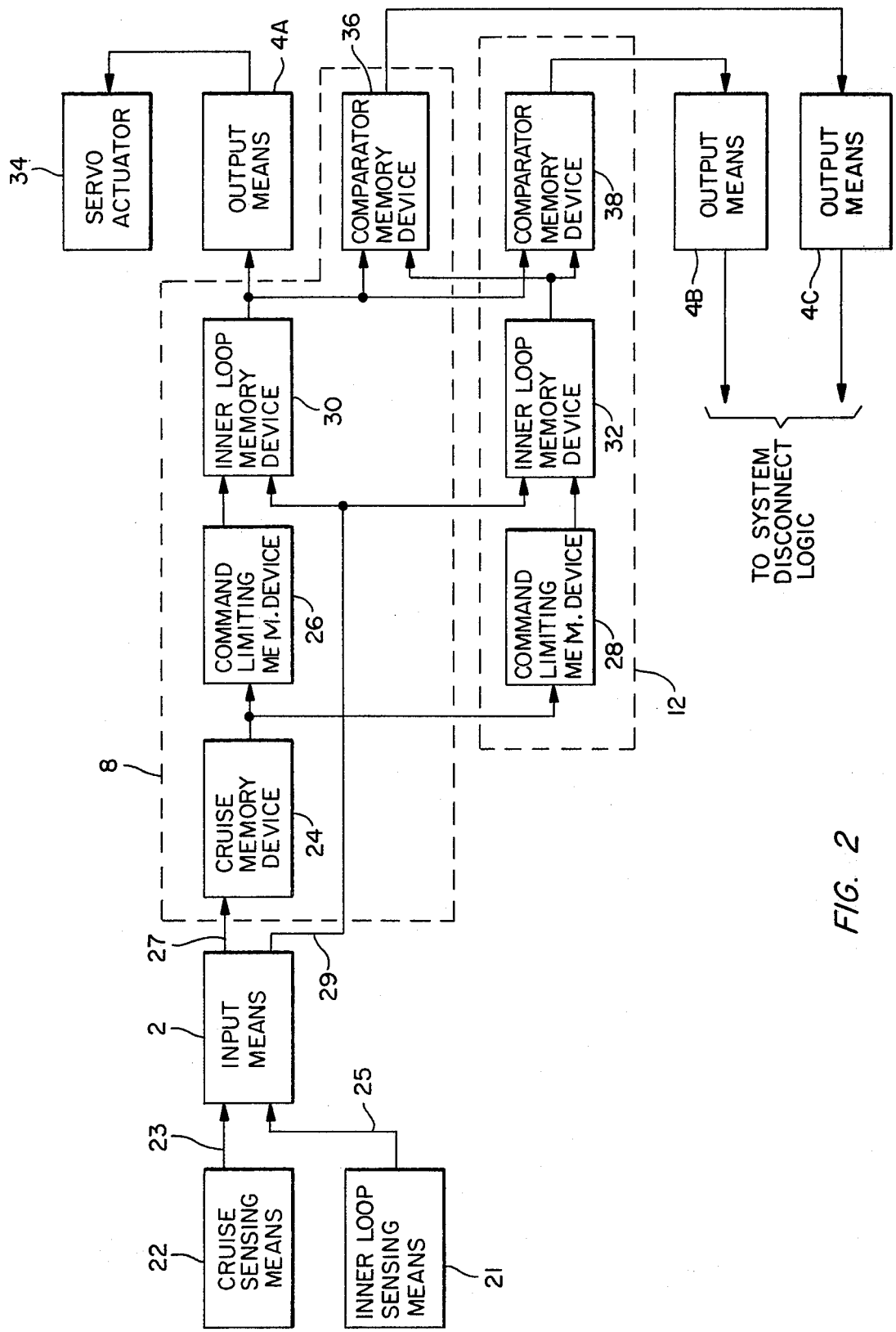
FIG. 2 is a block diagram showing an embodiment of the invention wherein the digital flight guidance system of the invention guides an aircraft when the craft is in a cruise mode.

Reference is now made to FIG. 2, wherein the digital flight guidance systems shown generally in FIG. 1 is shown in an embodiment for guiding an aircraft when the craft is in a cruise mode.

Cruise sensing means designated generally by the numeral 22, and which may include a conventional pitch attitude sensor such as a vertical gyro and a conventional air data computer for sensing other flight conditions and for computing other flight parameters as may be necessary for guiding the craft about, for example, the pitch axis, provides analog outputs corresponding to the flight conditions at an output line 23. Inner loop sensing means 21, which may include a conventional pitch rate gyro and a sensor coupled to the pilot-operated control wheel of the craft, provides analog outputs corresponding to the sensed condition at an output line 25. The analog outputs at output lines 23 and 25 are converted to digital outputs by input means 2 and are applied therefrom through output lines 27 and 29, respectively, to memory means 8 and 12 driven by processors 6 and 10, through DMA controller 18, as shown in FIG. 1.

In this connection, it is noted that processor 6 (FIG. 1) and memory means 8 perform all outer loop cruise computations as well as inner loop computations and cross processor monitoring. Processor 10 (FIG. 1) and memory means 12 perform only inner loop and cross processor monitoring computations. As will be hereinafter described, dual servo commands are generated which are jointly compared. Any significant discrepancy in the commands causes a system disconnect. Therefore, during cruise modes, rate and command limiting is achieved to limit maneuvers uncontrollable by the pilot due to internal failures of either of the processors and their associated active memory means. Thus, it is not important to know that such failures can exist or how they may be generated. This eliminates the need, as with single processor systems, to identify the failures and to provide self testing means to detect them, and hence provides a distinct advantage over such systems.

With continued reference to FIG. 2, the output from input means 2 at output line 27 is applied to a cruise memory device 24 (FIG. 4) in memory means 8, which performs the appropriate cruise computations in accordance with the conditions sensed by cruise sensing means 22. Cruise memory device 24 drives a command limiting memory device 26 (FIG. 5) in memory means 8 and a command limiting memory device 28 (FIG. 5) in memory means 12. Memory means 26 and 28 provide means for the processor to perform appropriate computations to provide required rate and displacement cruise command limiting.

Memory device 26 drives an inner loop memory device 30 (FIG. 6) in memory means 8 and memory device 28 drives an inner loop memory device 32 (FIG. 6) in memory means 12. The output from input means 2 at output line 29 is applied to memory devices 30 and 32. Memory devices 30 and 32 provide instructions to the processor which performs the required computations for providing high bandwidth stability control and for providing system outputs.

The system output from memory device 30 is applied through DMA controller 20 (FIG. 1) to output means 4A which performs a digital to analog conversion for providing a servo command output to drive a servo actuator 34 to control appropriate control surfaces of the aircraft as will be understood by those skilled in the art.

The system output from memory device 30 is applied to a comparator memory device 36 (FIG. 7) in memory means 8 and to a comparator memory device 38 (FIG. 7) in memory means 12, while the system output from memory device 32 in memory means 12 is applied to memory device 36 and to memory device 38. The outputs from memory devices 30 and 32 are compared by memory devices 36 and 38. The compared outputs from memory devices 36 and 38 are outputed through output means 4B and 4C, respectively, to provide analog monitoring outputs which are applied to suitable disconnect logic so that any difference in the computations performed by memory means 8 and 12 driven by processors 6 and 10, respectively, as heretofore described, will cause a system disconnect.

Although control of the craft about the pitch axis has been described it is noted that similar configurations are adaptable for controlling the craft about the other flight axes in accordance with the conditions sensed by sensing means 21 and 22 as will now be understood by those skilled in the art.

Figure 3:
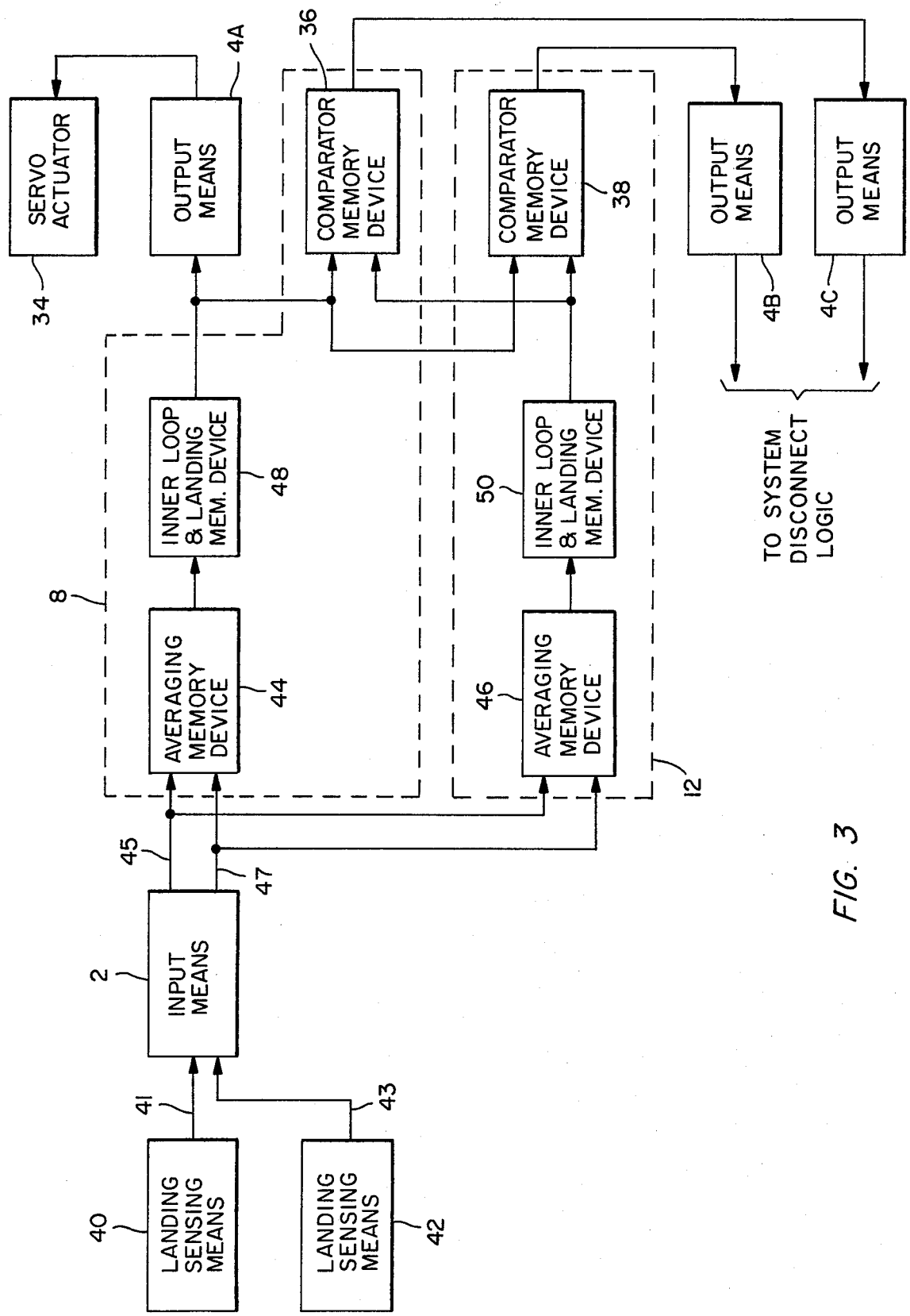
FIG. 3 is a block diagram showing an embodiment of the invention wherein the digital flight guidance system of the invention guides an aircraft during the landing maneuver.

With reference now to FIG. 3, memory means 8 and 12 may include appropriate memory devices to perform the required computations for guiding the aircraft during a critical flight maneuver. For purposes of illustration, the invention will be described with regard to guiding the craft when landing, although it is to be understood that guiding the craft during other critical maneuvers such as terrain following, or the like, can be accomplished as well with appropriate inputs to the memory means as will hereinafter become evident.

Thus, in the arrangement shown in FIG. 3, each of the memory devices 8 and 12 driven by processors 6 and 10, respectively, as shown in FIG. 1, operates on its own sensed data. In this way, even sensor failures are detected and passive disconnection of the system is accomplished.

Landing sensing means 40 and 42 shown generally in FIG. 3 may include attitude sensing vertical gyros, altimeters, glide slope sensors, and such other condition sensing devices as may be required to sense the appropriate conditions for landing the aircraft, and provide analog signals corresponding to the sensed conditions at output lines 41 and 43, respectively.

The analog outputs from sensing means 40 and 42 are converted to digital outputs by input means 2, which are provided at output lines 45 and 47, respectively. The digital outputs at output lines 45 and 47 are applied to averaging memory device 44 (FIG. 8) in memory means 8 and averaging memory device 46 (FIG. 8) in memory means 12. Memory device 44 drives an inner loop and landing memory device 48 (FIG. 9) in memory means 8, and memory device 46 drives an inner loop and landing memory device 50 (FIG. 9) in memory means 12.

The output from memory device 48 is applied through output means 4A to servo actuator 34 in a manner and for purposes as described with reference to FIG. 2. The outputs from memory devices 48 and 50 are applied to memory devices 36 and 38 in a manner and for purposes as heretofore described with reference to FIG. 2. Likewise the outputs from memory devices 36 and 38 are applied through output means 4B and 4C, respectively, to system disconnect logic.

It will thus be seen that any single or multiple axis failure is detected, including any internal failure of either of the processors and their associated active memory devices.

Memory means 8 and 12 shown generally in FIG. 1, and shown more specifically in FIGS. 2 and 3, incorporate random access memory (RAM) and read only memory (ROM) devices. The RAM is used as a scratch pad for required computations. The ROM contains the bulk of the memory allocation, which involves a main program including executive and computational functions, mode logic, program linkages and subroutines. The separate memory means 8 and 12 associated with processors 6 and 10, respectively, provide rapid indication of failures, since the two processors are in a configuration wherein they are continuously monitoring one another.

In connection with the invention as described with reference to FIGS. 2 and 3, it will be understood that memory devices 24, 26, 28, 30, 32, 36, 38, 40, 44, 46, 48 and 50 are readily available programmable read only memory devices (PROMs) such as manufactured by Signetics, Inc., under their trade designation 82-S-191. The various memory devices include cascaded arrangements of these PROMs to perform the memory function intended as is well known in the art. For purposes of illustration, cruise memory device 24 may include four such PROMs in cascaded arrangement; command limiting memory devices 26 and 28, inner loop memory devices 30 and 32, comparator memory devices 36 and 38 and averaging memory devices 44 and 46 may include two such PROMs in cascaded arrangement; and inner loop and landing memory devices 48 and 50 may include six of such PROMs in cascaded arrangement.

It will now be understood that memory devices 24, 26, 28, 30, 32, 36, 38, 40, 44, 46, 48 and 50 must be uniquely programmed to perform the functions intended, and for the interconnections as shown in FIGS. 2 and 3 so as to provide an operative system in accordance with the invention. It will be further understood that once the control laws for the various functions to be performed by the several memory devices are defined, a programmer with ordinary skill in the art can program the control laws into an appropriate assembly language from which a machine code is generated and thereafter outputed on a punched paper tape, for example, for burning data into the memory device. To this end the control laws for the several memory devices are illustrated in FIGS. 4 through 9, which will next be described.

Figure 4:
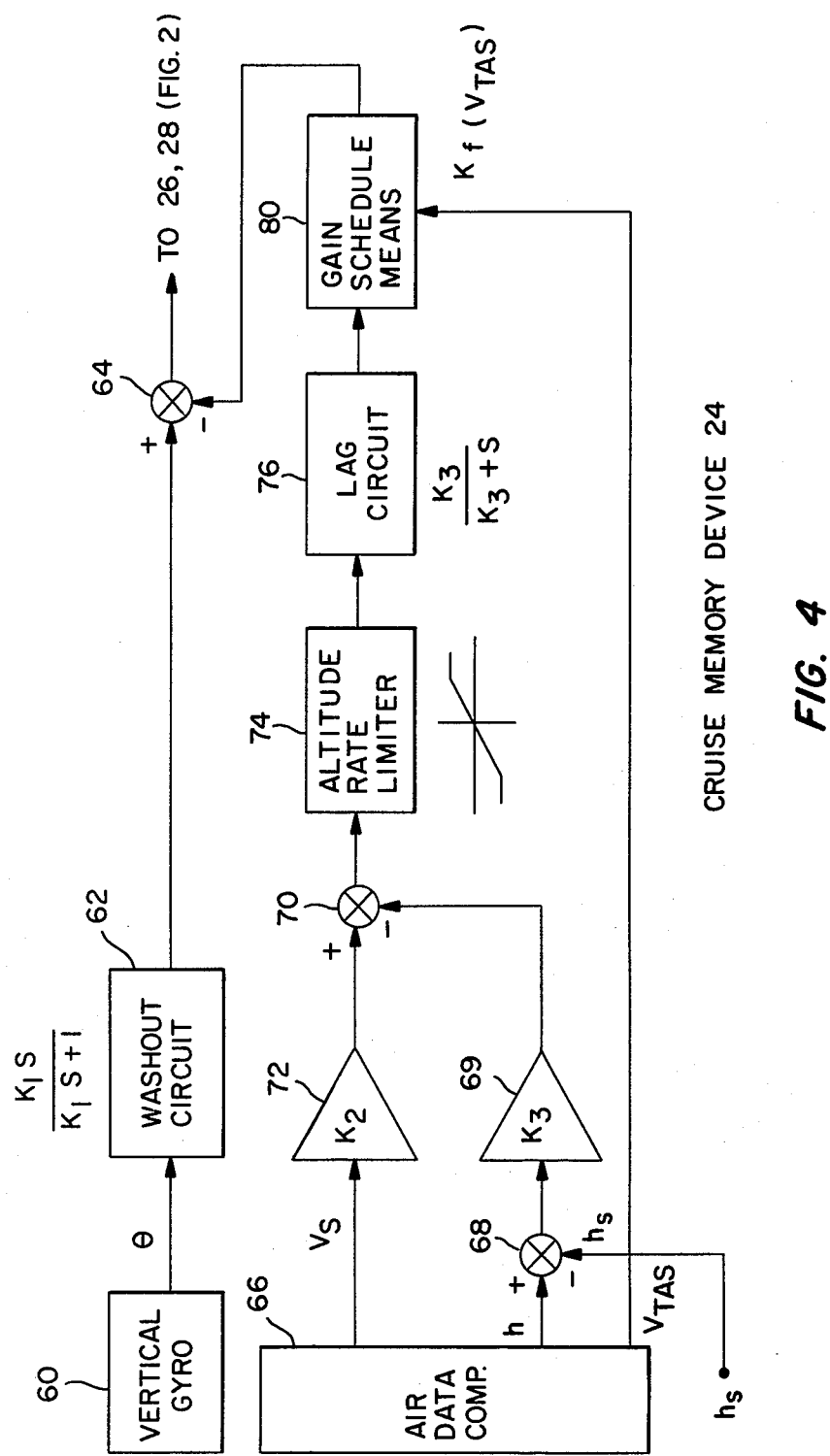
FIG. 4 is a block diagram illustrating control laws for implementing cruise memory device 24 shown in FIG. 2.

With reference now to FIG. 4, wherein the control law for cruise memory device 24 is illustrated, a vertical gyro 60 provides a signal $\theta$ corresponding to the pitch attitude of the craft and which signal is applied through a washout circuit 62 having a transfer function as shown to a summing device 64.

An air data computer 66 provides a signal $V_s$ corresponding to the vertical speed of the craft, a signal h corresponding to altitude and a signal $V_{TAS}$ corresponding to the true airspeed of the craft. A signal $h_s$ corresponding to a selected altitude is provided by external means well known in the art. Signals h and $h_s$ are applied to a summing means 68 and therefrom through an amplifier 69 having a gain $K_3$ to a summing means 70. Signal $V_s$ is applied through an amplifier 72 having a gain $K_2$ to summing means 70, and summed thereat with the signal from amplifier 69.

The summation signal is applied to an altitude rate limiter 74 which limits the altitude rate of the aircraft to, for example, ±thirty feet per second. The output from altitude rate limiter 74 is applied to a lag circuit 76 having a transfer function as shown and the output from lag circuit 76 is applied to a gain schedule means 80. Signal $V_{TAS}$ from air data computer 66 is applied to gain schedule means 80 to control the gain schedule thereof as a function of true airspeed. The output from gain schedule means 80 is applied to summing means 64 and summed thereat with the output from washout circuit 62. The output from summing means 64 is an outer loop command which is applied to command limiting memory devices 26 and 28 shown in FIG. 2.

Figure 5:
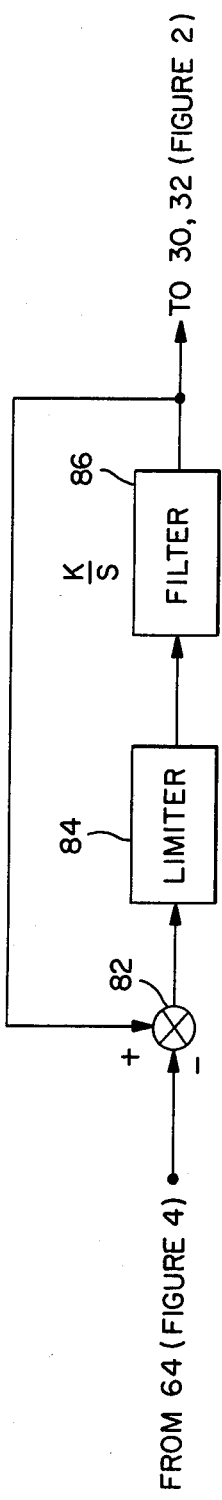
FIG. 5 is a block diagram illustrating control laws for implementing command limiting memory devices 26 and 28 shown in FIG. 2.

The control law for command limiting memory devices 26 and 28 is shown in FIG. 5, wherein the output from summing means 64 (FIG. 4) is applied through a summing device 82 to a limiter 84 and therefrom to a filter 86 having a transfer function as shown. The output from filter 86 is fed back to summing means 82 and represents an outer loop command limit which is applied to inner loop memory devices 30 and 32 shown in FIG. 2.

Figure 6:
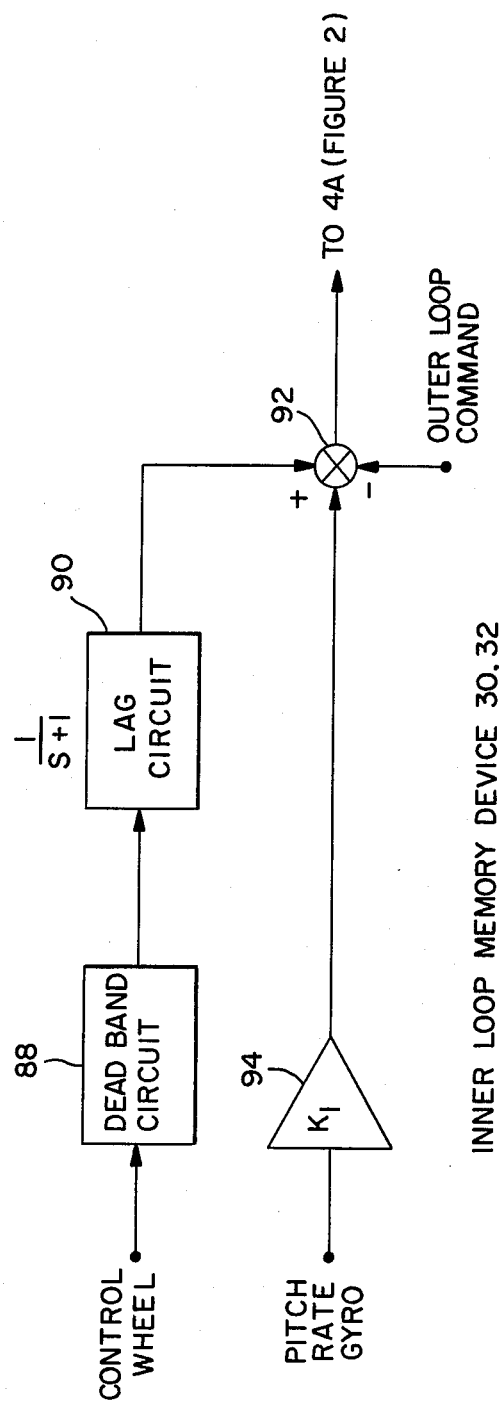
FIG. 6 is a block diagram illustrating control laws for implementing inner loop memory devices 30 and 32 shown in FIG. 2.

The control law for inner loop memory devices 30 and 32 is shown in FIG. 6. Thus a signal corresponding to the pilot exerted force on the control wheel of the aircraft is applied to a dead band circuit 88 and therefrom to a lag circuit 90 having a transfer function as shown to a summing means 92.

A signal corresponding to the pitch rate of the aircraft as may be provided by a pitch rate gyro is applied to an amplifier 94 having a gain $K_1$ and therefrom to summing means 92 where it is summed with the output from lag circuit 90 and with the output from command limiting memory devices 26 and 28 provided in accordance with FIG. 5. The output from summing means 92 is applied to output means such as that designated as 4A in FIG. 2.

The control law for comparator memory devices 36 and 38 is shown in FIG. 7. Thus, the output from inner loop memory device 30 and the output from inner loop memory device 32 is applied to a summing means 94 and summed thereat, with the summed output being applied to a level detector 96 which compares the level of the summed output with a threshold signal $E_T$ to provide a compared output. The compared output is applied to an output device such as that designated as 4B in FIG. 2.

The control law for averaging memory devices 44 and 46 is shown in FIG. 8. Thus the outputs from input means 2 at output lines 45 and 47 (FIG. 3) are applied to a summing means 98 which sums the outputs, with the summed output being applied to a divider 99 which divides the output by two to provide an averaged output. The averaged output is applied to inner loop and landing memory devices 48 and 50 shown in FIG. 3.

Figure 9:
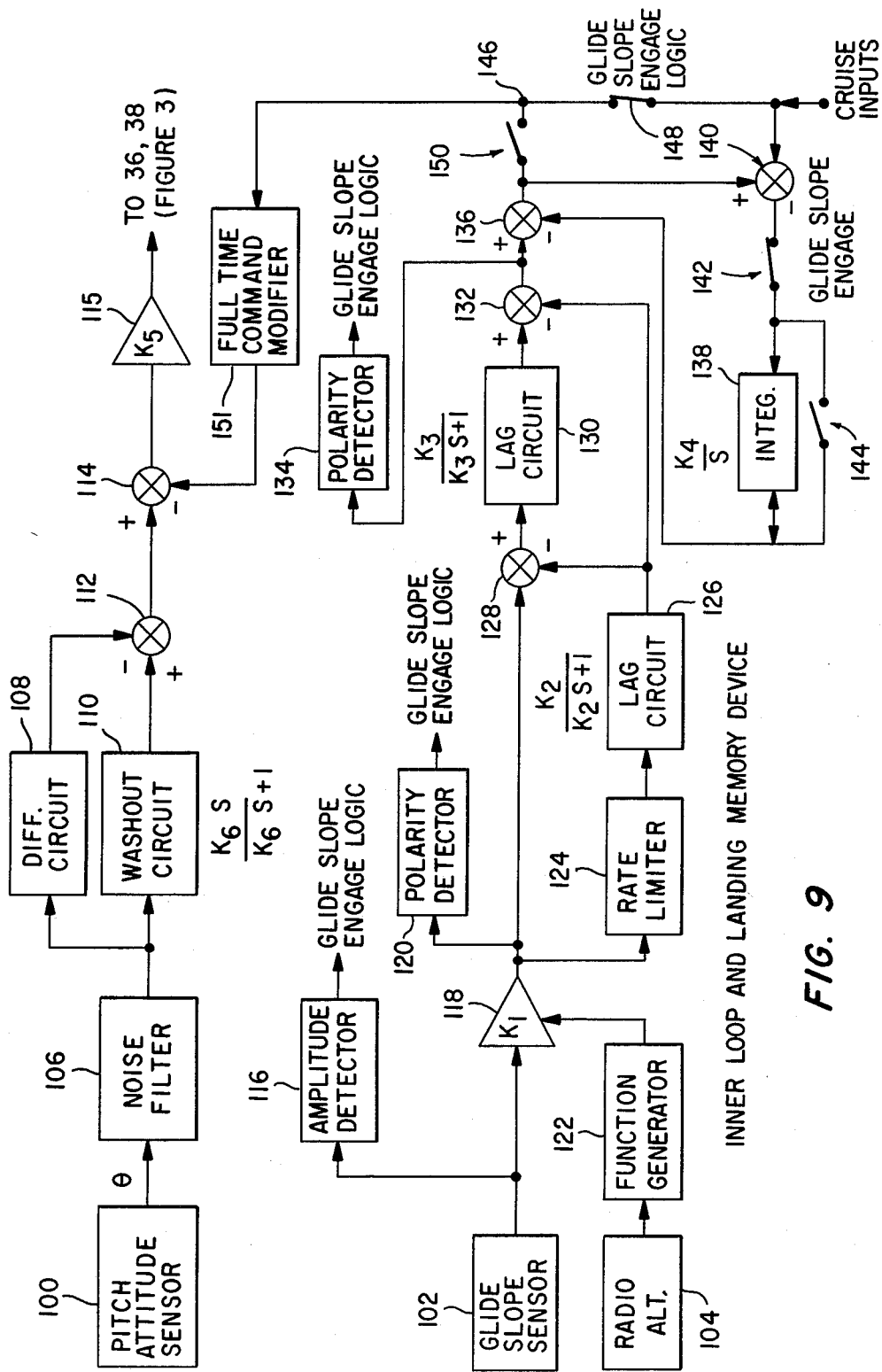
FIG. 9 is a block diagram illustrating control laws for inner loop and landing memory devices 48 and 50 shown in FIG. 3.

The control law for inner loop and landing memory devices 48 and 50 is illustrated in FIG. 9. A pitch attitude sensor 100 provides a signal $\theta$ corresponding to the pitch attitude of the aircraft. A glide slope sensor 102 provides a signal corresponding to the displacement of the aircraft from the center of a glide slope beam and a radio altimeter 104 provides a signal corresponding to the altitude of the aircraft.

Pitch attitude signal $\theta$ is applied through a noise filter 106 to a differentiating circuit 108 which provides a pitch attitude rate signal, and to a washout circuit 110 having a transfer function as shown. The outputs from differentiating circuit 108 and from washout circuit 110 are applied to a summing means 112. The output from summing means 112 is applied to a summing means 114.

The output from glide slope sensor 102 is applied to an amplitude detector 116 which provides a glide slope engage logic signal of appropriate amplitude. The output from the glide slope sensor is applied through an amplifier 118 having a gain $K_1$ to a polarity detector 120 which provides a glide slope engage logic signal of appropriate polarity.

The signal from radio altimeter 104 is applied to a function generator 122 which shapes the signal and the shaped signal adjusts the gain of amplifier 118. The signal from amplifier 118 is applied to a rate limiter 124 and therefrom to a lag circuit 126 having a transfer function as shown. The signal from amplifier 118 and the signal from lag circuit 126 are summed by a summing means 128 and the summed signal is applied to a lag circuit 130 having a transfer function as shown. The signals from lag circuit 126 and from lag circuit 130 are applied to a summing means 132 and the summation signal therefrom is applied to a polarity detector 134 which provides a glide slope engage logic signal of appropriate polarity.

The signal from summing means 132 is applied to a summing means 136 and summed thereat with the output of an integrator 138 having a transfer function as shown. Integrator 138 receives the input from a summing means 140 through a normally closed switch 142. The output from summation means 140 is the summation of the output from summation means 136 and cruise inputs provided as heretofore described. The input to integrator 138 is connected to the output thereof through a normally open switch 144.

The cruise inputs are connected to a circuit point 146 through a normally closed switch 148 and the output from summing means 136 is connected to circuit point 146 through a normally open switch 150. Normally closed switch 148 and normally open switch 150 are connected to a full time command modifier 151, the output of which is applied to summing means 114. The output from summing means 114 is applied to an amplifier 115 having a gain $K_5$, the output of which is applied to comparator memory devices 36 and 38 shown in FIG. 3.

It will be understood that the control laws illustrated in FIGS. 4 through 9 are for illustrative purposes only, and are typical control laws for implementing the device of the invention, such control laws being well known to those skilled in the flight control system art. It will be further understood that other control laws may be developed for controlling the aircraft in other modes, the same being within the scope of the invention.

Thus, with the control laws as illustrated and with the appropriate parameters such as glide slope, vertical speed, altitude, true airspeed, and such other required parameters defined, it is well within the skill of a programmer to program the control laws in assembly language. The programmer generates a machine code through an assembler program in a general purpose computer such as, for purposes of illustration, an IBM 370 computer. The machine code is outputed on a punched paper tape, for example, and in a format that is useable to program the several PROMS through a PROM Programmer such as that marketed by Data I/O Corporation as their Model 5.

Thus, a blank PROM such as the Signetic's PROM heretofore referred to is inserted in the PROM Programmer and the punched paper tape is then used to "burn" the specific machine code into the PROM memory device, as is well known in the art.

It will now be seen from the aforenoted description of the invention that the heretofore stated objects have been met. A digital flight guidance system including dual processor/memory architecture has been described for guiding an aircraft during cruise modes and when performing critical flight maneuvers such as landing and the like. Each processor performs some of the same functions of the other processor, but in a different manner to provide the degree of redundancy required for a certifiable system. During the landing maneuver, any single or multiple axis failure is detected, including any internal failure of either of the processors and their associated active memory devices. During cruise modes, appropriate rate and displacement command limiting is achieved for the heretofore noted purposes. Thus, with the arrangement illustrated and described it is not important to know the specific failure modes or how they are manifested. Identification of the failures themselves is thus unnecessary.

Although several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art. For example, in the dual processor configuration described herein, one of the processors could fully assume the guidance function of the aircraft about a flight axis to eliminate the possibility of an all-axis hardover due to a failure in any one of the processor/memory means.

What is claimed is:

1. A digital system for guiding the flight of an aircraft, comprising:
   a pair of processors;
   a pair of memory means, each of which is associated with a corresponding processor;
   system input means commonly associated with the processors and their corresponding memory means;
   means for sensing outer loop flight guidance conditions;
   means for sensing inner loop flight guidance conditions;
   the system input means connected to the outer loop condition sensing means and responsive to the sensed conditions therefrom for providing an outer loop condition output, and connected to the inner loop condition sensing means and responsive to the sensed conditions therefrom for providing an inner loop condition output;
   one of the processors and its associated memory means connected to the input means, said associated memory means including means responsive to the outer loop condition output and means responsive to the inner loop condition output for providing a first system output for outer loop and inner loop guidance of the flight of the aircraft; and
   the other of the processors and its associated memory means connected to the input means, said associated memory means including means responsive to the inner loop condition output for providing a second system output for inner loop guidance of the flight of the aircraft.

2. A system as described by claim 1, wherein:
   each of the memory means includes means for comparing the system output therefrom to the system output from the other of the memory means and for providing a compared system output; and
   the system includes output means connected to one of the memory means and responsive to the system output therefrom for providing a command output, and connected to the comparing means included in each of the memory means and responsive to the compared system output therefrom for providing a corresponding monitoring output.

3. Apparatus as described by claim 1, wherein:
   the memory means associated with the one processor includes comparator means for comparing the first system output provided by said memory means to the second system output provided by the memory means associated with the other of the processors and for providing a first compared output; and
   the memory means associated with the other of the processors includes means for comparing the second system output provided by said memory means to the first system output provided by the memory means associated with the one processor and for providing a second compared output.

4. Apparatus as described by claim 3 including:
   system output means having first means connected to the comparator means in the memory means associated with the one processor and responsive to the first compared output therefrom for providing a first logic output, and second means connected to the comparator means in the memory means associated with the other of the processors and responsive to the second compared output therefrom for providing a second logic output.

5. Apparatus as described by claim 3, including:
   system output means having first means connected to the comparator means in the memory means associated with the one processor and responsive to the first compared output therefrom for providing a first logic output, and second means connected to the comparator means in the memory means associated with the other of the processors and responsive to the second compared output therefrom for providing a second logic output.

6. Apparatus as described by claim 1, including;
   system output means having means connected to the memory means associated with the one processor and responsive to the first system output therefrom for providing a command output; and
   aircraft control surface actuating means connected to the means connected to the memory means associated with the one processor and responsive to the command output therefrom for actuating an aircraft control surface for the outer loop and inner loop guidance of the flight of the aircraft.

7. A digital system for guiding the flight of an aircraft comprising:
   a pair of processors;
   a pair of memory means, each of which is associated with a corresponding processor;
   system input means commonly associated with the processors and their corresponding memory means;
   first means for sensing outer loop flight guidance conditions;
   second means for sensing corresponding outer loop flight guidance conditions;
   the system input means connected to the first and second means and responsive to the sensed conditions therefrom for providing first and second outer loop condition outputs;
   one of the processors and its associated memory means connected to the input means, said associated memory means including means responsive to the first outer loop condition output for providing a first system output for outer and inner loop guidance of the flight of the aircraft; and
   the other of the processors and its associated memory means connected to the input means, said associated memory means including means responsive to the second outer loop condition output for providing a second system output for outer loop and inner loop guidance of the flight of the aircraft.

8. A system as described by claim 7, wherein:
each of the memory means includes means for comparing the system output therefrom to the system output from the other of the memory means and for providing a compared system output; and
the system includes output means connected to one of the memory means and responsive to the system output therefrom for providing a command output, and connected to the comparing means included in each of the memory means and responsive to the compared system output therefrom for providing a corresponding monitoring output.

9. Apparatus as described by claim 7, wherein:
the memory means associated with the one processor includes comparator means for comparing the first system output provided by said memory means to the second system output provided by the memory means associated with the other of the processors and for providing a first compared output; and
the memory means associated with the other of the processor includes means for comparing the second system output provided by said memory means to the first system output provided by the memory means associated with the one processor and for providing a second compared output.

10. Apparatus as described by claim 7 including:
system output means having means connected to the memory means associated with one of the processors and responsive to one of the first and second system outputs for providing a command output; and
aircraft control surface actuating means connected to the means connected to the memory means associated with the one processor and responsive to the command output therefrom for actuating an aircraft control surface for the outer loop and inner loop guidance of the aircraft.

* * * * *